July 15, 1958  D. A. WILLIAMS  2,842,886
FISH LINE FLOAT AND CLAMP
Filed May 7, 1956
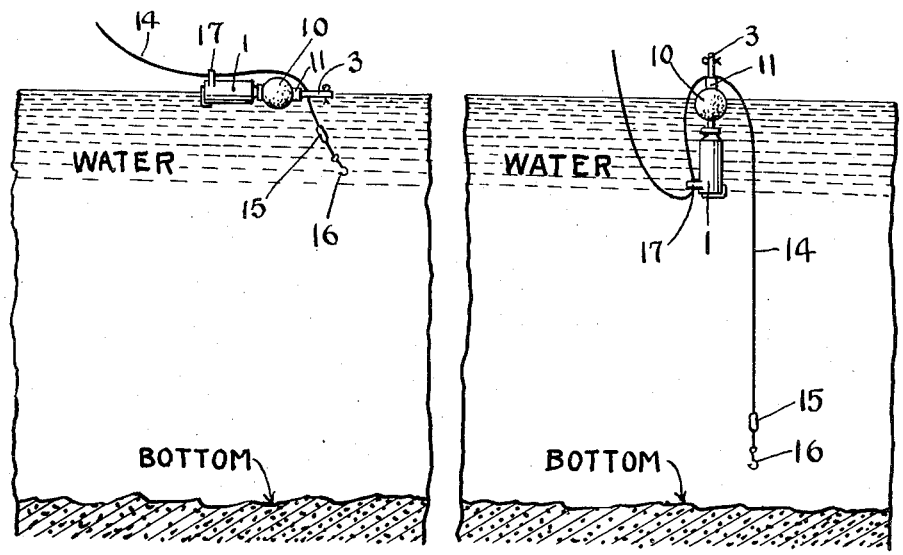
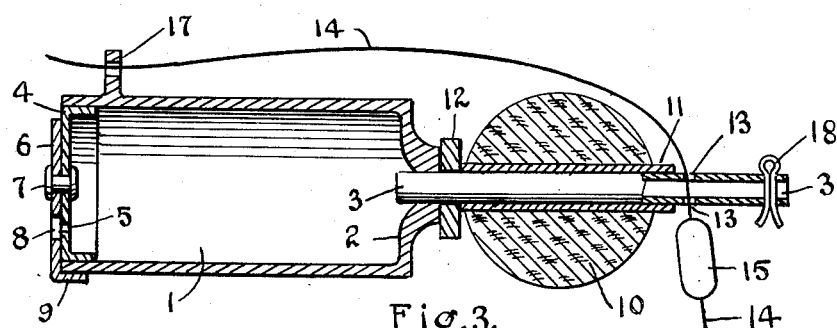
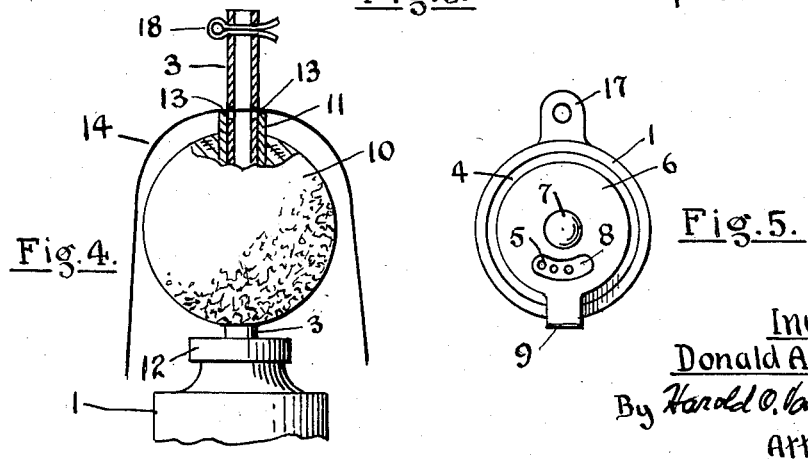
Inventor
Donald A. Williams
By Harold O. Van Antwerp
Attorney.

United States Patent Office 2,842,886
Patented July 15, 1958

2,842,886
FISH LINE FLOAT AND CLAMP
Donald A. Williams, Flint, Mich.

Application May 7, 1956, Serial No. 582,978

4 Claims. (Cl. 43—44.87)

This invention relates to a fish line float and clamp particularly intended to be used in casting the hook and line to catch fish. Its principal use is to enable the fisherman to cast out the line with the hook, sinker, and float attached and to then permit the line to play out from the float a predetermined distance whereupon the float automatically clamps the line so that the hook will only sink the predetermined depth into the water. This is particularly desirable in relatively shallow water to prevent the hook from dragging on the bottom.

The invention provides various novel features of construction and arrangement hereafter more fully described, reference being had to the accompanying drawings in which, Fig. 1 shows the float resting upon a body of water and in position to allow the line to pay away from it, Fig. 2 shows the float on the body of water and tipped to a position to clamp the line, Fig. 3 is a longitudinal section of the float in horizontal position with the line free, Fig. 4 is a fragmentary view with parts broken away tipped to a vertical line clamping position, and Fig. 5 is a view of one end of the float.

Like reference numbers refer to like parts in all of the figures.

The float comprises a hollow body 1, preferably cylindrical in shape and closed at both ends. The end 2 of the body 1 has a tube 3 projecting centrally therefrom, the tube being open at both ends and communicating with the interior of the body. The opposite end 4 of the body has a series of holes 5 therethrough and a disk 6 is rotatably attached at 7 to the end 4 and is provided with an arcuate slot 8 in register with the holes 5 and can be rotatably adjusted by means of a finger piece 9 so that more or less of the holes 5 can be exposed through the slot 8.

A float 10 made of light weight material such as cork has a central bushing 11 extending through it which is slidably mounted on the tube 3 which has one end remote from the body 1 projecting beyond the bushing 11. A metallic weight 12 is located upon the tube 3 between the float 10 and the end 2 of the body 1.

Beyond the outer end of the bushing 11 and spaced from the end thereof when the float 10 is retracted toward the body 1, is a pair of aligned holes 13 through which the fish line 14 is threaded, the line extending away from the float and is provided with a customary sinker and hook 16. In the other direction the line 14 extends loosely through an eye 17 mounted on the body 1 near its end 4 and then the line leads to the ordinary fish pole and line reel in the hands of the fisherman. A cotter pin 18 passes through the tube 3 near its outer end to prevent inadvertent disassembling of the parts when the line 14 is not in place.

In use the line 14 with the hook 16 and sinker thereon, is pulled up so that the sinker is close to the float. Then the float, hook and sinker are cast out and when they reach the surface of the water the float will rest horizontally on the water because the float contains only air and is very light. The fisherman releases the line and the weight of the hook and sinker causes the line 14 to pass slowly through the eye 17 and the holes 13 in the tube 3 while the hook and sinker move toward the bottom of the water body.

But during this time water enters the body 1 through the holes 5 as air passes out therefrom through the tube 3. As water passes into the body 1 it becomes heavier and gradually sinks toward a vertical position.

When the angularity of the device with respect to the vertical is such that the body 1 with the tube 3 starts to sink the tube 3 will slide downwardly in the bushing 11, the buoyancy of the float 10 being such that it cannot sink, and the outer end of the bushing 11 will clamp the line 14 against the edges of the holes 13 in the tube and prevent further movement of the line thus suspending the hook and sinker in the water.

The speed with which the water enters the body may be regulated by adjusting the disk 6 so that more or less of the holes 5 are exposed through the slot 8 and this controls the time in which the float moves from a horizontal position to that approaching the vertical in which the body 1 and tube 3 will slide down to line clamping position. Since the line moves with approximately constant speed through the eye 17 and holes 13, the length of time from the beginning of its movement until it is clamped controls the length of line that will be payed out and thus the device may be adjusted to stop downward movement of the hook before it strikes the bottom of either shallow or deeper water.

It preferred, the restricted water entrance into the body may be made non adjustable so that the float will always tilt to line clamping position in given time and the adjustment to govern the length of line that will pay out before clamping can be made by varying the weight of the sinker 15 so that the line will pay out at different speeds.

When the line is pulled in to be recast the pull will be upwardly on the eye 17 which will turn the float to an inverted position which will permit the water in the body 1 to empty through the tube 3 so that the device will be in condition for another casting operation.

The invention is defined in the appended claims which are to be considered comprehensive of all forms coming within their scope.

I claim:

1. The combination with a fish line and hook of a device of the class described comprising a first float and a second float movably connected together and adapted to rest upon the surface of a body of water, said first float having an air chamber, means for loosely guiding the fish line on one of said floats, restricted means for permitting water to enter the chamber of the first float causing it to sink in the water and thereby causing movement between said first and second floats, and means actuated by said movement acting to clamp the fish line on the float.

2. The elements of claim 1 in combination in which said restricted means for permitting water to enter said chamber is variable.

3. The combination with a fish line and hook of a device of the class described comprising, a float having a chamber therein and adapted to rest initially in one position upon the surface of a body of water, restricted means for permitting water to enter said chamber causing the float to assume a different position in said water, means including a clamp slidably mounted on said float, means for loosely guiding said fish line on said float, said clamp being actuated by said change of position of the float to clamp said fish line thereto.

4. The elements of claim 3 in combination in which said clamp slides longitudinally of said float.

References Cited in the file of this patent

UNITED STATES PATENTS 1,993,974     McVicker _____ Mar. 12, 1935

FOREIGN PATENTS 1,036,232     France _____ Apr. 22, 1953